May 24, 1932.  W. C. BUTTNER  1,859,914
REGULATOR VALVE
Filed April 19, 1929
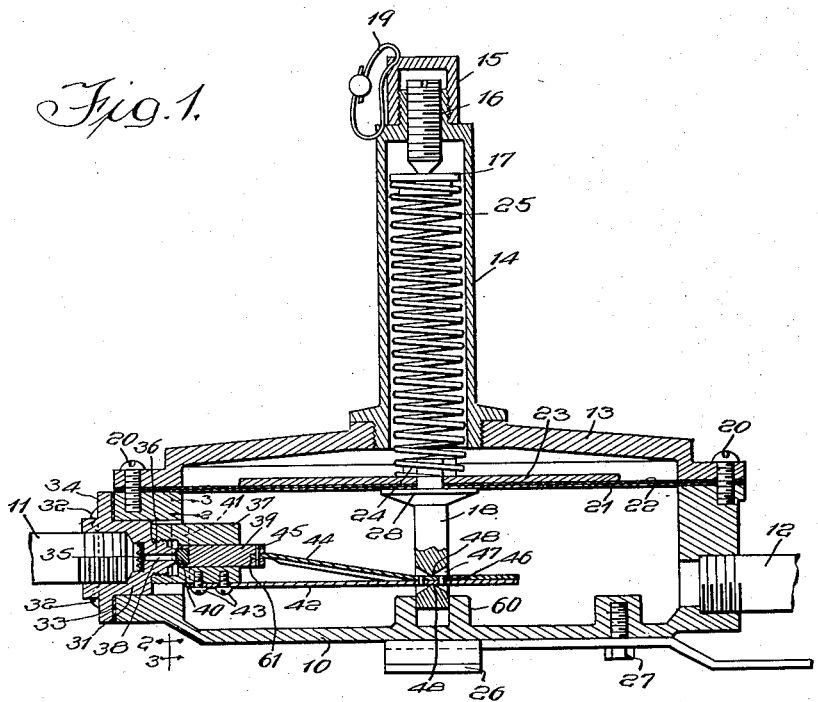
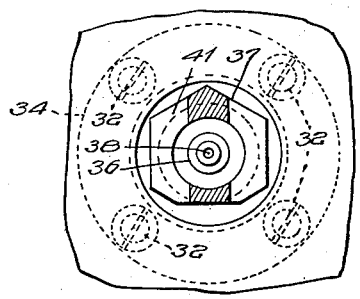
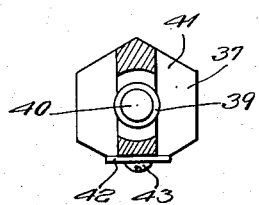
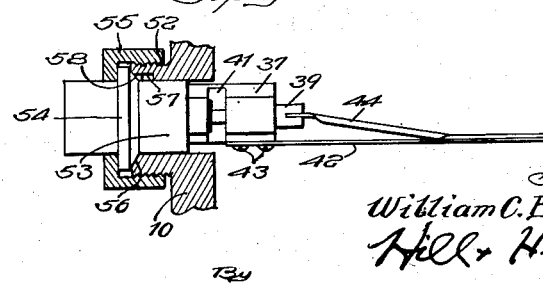
Witness:
William P. Kilroy
Inventor
William C. Buttner
Hill & Hill
Attys Patented May 24, 1932

1,859,914

UNITED STATES PATENT OFFICE

WILLIAM C. BUTTNER, OF WINNETKA, ILLINOIS, ASSIGNOR TO THE BASTIAN-BLESSING COMPANY, OF CHICAGO, ILLINOIS, A CORPORATION OF ILLINOIS

REGULATOR VALVE

Application filed April 19, 1929. Serial No. 356,562.

My invention relates to regulating devices adapted for installation in a system of pipes and more particularly it relates to regulator valves for reducing the pressure of gas or liquid to any predetermined minimum pressure.

It is desirable in many instances that gas or other fluids be delivered to the point of consumption under a constant pressure and in order to accomplish this result it is necessary that regulator means be installed, intermediate the source of supply and of delivery, and more particularly my invention relates to regulator valves which are automatically controlled by the pressure of the fluid contained within the conduit in which the valves are installed, and my invention has as one of its objects the provision of an improved pressure controlled valve regulator mechanism of the kind described.

Such a valve mechanism is normally required to be removed from its housing after a period of use, for the purpose of cleaning and repairing and, as such valves are at present constructed, either the valve mechanism or the housing, or both, are necessarily disassembled or dismantled in order that such removal of the parts be accomplished and it is another object of the invention to provide improved regulator valve mechanism adapted to be assembled as a unit and installed and removed from its housing as an assembled unit without dismantling the housing or disturbing the pressure controlled means contained therein to actuate the valve mechanism.

A further object of the invention is the provision of valve mechanism of the kind described comprising a small number of relatively simple parts so assembled as to minimize the necessity for cleaning and repairing and which is easily removed and installed in its operative position.

A still further object of the invention is to provide an improved regulator mechanism of the kind described comprising a housing for assembled valve mechanism and pressure controlled means wherein the valve mechanism, when assembled as a unit, is insertable in and removable from the housing through an opening forming a seat for the valve mechanism, the pressure controlled means and the valve mechanism being so positioned that the mechanism operatively engages the means when the mechanism is inserted in the housing.

Still another object of the invention is the production of a device of the kind described which is simple in construction, of a small number of parts, easy to manufacture, durable, reliable and highly satisfactory for its intended purpose.

Many other objects and advantages of the construction herein shown and described will be obvious to those skilled in the art from the disclosure herein given.

To this end my invention consists in the novel construction, arrangement and combination herein shown and described and more particularly pointed out in the claims.

Referring now to the drawings forming a part of this specification, wherein like reference characters indicate like or corresponding parts:

Fig. 1 is a section through a regulator mechanism embodying the device of my invention;

Fig. 2 is a section along the line 2—2 of Fig. 1;

Fig. 3 is a section along the line 3—3 of Fig. 2; and

Fig. 4 is a view of a modified form of my invention.

Referring now more particularly to the drawings a body 10 is provided with a bonnet or cap 13. The bonnet 13 is fastened to the body 10 by a plurality of screw bolts 20, the body and bonnet together forming a housing in which valve mechanism operable to control the flow of fluid into the housing is positioned. The regulator mechanism is adapted for mounting in any pipe line wherein it is desired to control or regulate the pressure and the flow of fluid and as shown in Fig. 1, the mechanism is positioned to connect the inlet pipe 11 with an outlet pipe 12.

In some instances it may be desirable to support the mechanism independently of the pipes 11 and 12 and in such case a bracket 26 mounted on the body 10 by a screw bolt 27 may be utilized and the bracket fastened to any convenient supporting member.

The discharge from the pipe 11 into the regulator mechanism is controlled through a valve mechanism comprising a valve body 37 and a generally cylindrical shaped adapter member 31 with which the body cooperates. The body 37 and the member 31 may be constructed as a unit, if desired. The member 31 has an annular shoulder 34 between which and the end of the body 10 a gasket 33 is positioned to form a fluid tight connection. The member 31 is fastened to the body 10 by a plurality of screw bolts 32.

The valve body 37 is elongated and is preferably constructed of a substantially hexagonal cross section. The inner end of the member 31 has a reduced neck portion 36 with which the valve body 37 has a threaded connection. A relatively small duct 38 extending through the adapter member 31 provides a conduit for fluid flowing from the pipe 11. An adapter screen 35 is positioned at the outer end of the duct 38 to prevent particles of dirt and other foreign material entering and clogging the valve. A cylindrical shaped plunger 39 is slidably mounted in the valve body 37. The outer end of the plunger 39 is provided with a seat 40 which is operable to open and close the inner end of the duct 38. The valve body 37 has oppositely positioned channels 41 formed therein, through which fluid flows from the duct 38 when the valve is open. The size and shape of the channels 41 are best shown in Fig. 4. The details of the valve construction may be varied or changed if desired, to permit the use of materials required by the character of the gas or liquid to be controlled.

The seat 40 is shown in Fig. 1 as closing the duct 38. Upon moving the plunger 39 to the right, the duct 38 will be opened for the discharge of gas or fluid coming from the pipe 11 through the screen 35. The fluid escaping from the duct 38 is discharged through the channels 41 into the interior of the body 10.

A tension member 42 forms a cantilever fastened at one end to the under side of the valve body 37 by a pair of screw bolts 43. The member 42 preferably takes the form of a spring plate which bends under transverse pressure and has sufficient resilience to rectify itself when such pressure is released. The other end of the member 42 is connected to the outer end of a compression member or bar 44 by a pair of pins 46 or by any other suitable means. The outer end of the compression member 44 is shown as fastened in a recess 61 in the inner end of the plunger 39 by means of a pin 45. The bar 44 would, however, be held in position in the slot or aperture 61 in the end of the plunger 39 without the pin 45 by reason of the resiliency of the spring plate tension member 42.

The tension member 42 is preferably sufficiently resilient to yield or bend under slight transverse pressure. Because of this resiliency, the member 42 will not normally hold the member 44 in the position shown in Fig. 1 wherein the plunger 39 occupies its extreme left position with the seat 40 closing the duct 38, since the gas pressure in the pipe 11 is usually enough higher than the predetermined pressure in the body 10 to move the plunger 39 inwardly. Since the movement of the plunger 39 is slight, the tension member 42 is so mounted that it holds the plunger in approximately its closed position, it being a matter of indifference whether or not the member 42 holds the valve closed as the valve is controlled by a diaphragm as hereinafter described.

The movement inwardly of the plunger 39 moves the pressure member 44 to the right and causes the outer connected ends of the tension member 42 and of the compression member 44 to move downwardly. The pin 45 serves only nominally to keep the member 44 in fixed position relative to the plunger 39, the pin actually functioning to operatively connect the member and plunger only in case the plunger should become lodged in its mounting or the like.

In order that the valve mechanism be held in a state of balanced equilibrium during flow conditions, I have provided means automatically operable by the fluid pressure in the body to control the opening and closing of the valve mechanism. The means takes the form of a diaphragm positioned between the bonnet 13 and the body 10, and operating to keep the valve in a state of balanced equilibrium during flow conditions. The diaphragm comprises a lower sheet 21 which may be constructed of flexible material, an upper sheet 22, preferably constructed of leather or similar material, and a centrally positioned diaphragm plate 23. A yoke member 18 projects upwardly through the diaphragm plate 23 and is suspended therefrom by means of a lock nut 24. An annular shaped collar 28 on the yoke member 18 cooperates with the nut 24 to cause the yoke member to move with the diaphragm.

The lower end of the yoke member 18 is slidably mounted in an apertured boss 60 forming a guide for the yoke member. The boss 60 is fastened by any suitable means to the bottom of the body 10. The lower end of the yoke member 18 has an aperture 47 extending therethrough. The bounding faces of the aperture 47 converge inwardly to form spaced apart edges 48. The connected ends of the tension member 42 and of the compression member 44 are positioned between and in operative contact with the edges 48 for all positions of the diaphragm.

The connected ends of the member 42 and the member 44 are of such thickness as to easily enter the aperture 47 but in substantial contact with both edges 48; the sloping faces of the aperture serving to guide the members into the aperture. The members 42 and 44 being thus positioned in the aperture 47, when the fluid pressure in the body 10 reaches a predetermined point the diaphragm is elevated and the members 42 and 44 are held in the closed position of the duct 38, as observed in Fig. 1. When the pressure within the body 10 drops below such predetermined point the diaphragm will be lowered and move the yoke member 18 to a position wherein the members 42 and 44 will move to open the duct 38 to the flow of gas or fluid.

Spring means is provided for regulating and controlling the critical pressure at which the diaphragm will move to permit the opening and closing of the valve mechanism. The means thus provided includes a cylindrical member 14 opening through the bonnet 13 and having a threaded connection at its lower end therewith. A spring 25 is mounted in the cylindrical member 14, the lower end of which is held in position by the locknut 24 and its upper end bears against a spring button 17. An adjusting screw 16 contacts with the button 17 and by threading the screw inwardly or outwardly, the resistance to the upward movement of the diaphragm will be correspondingly increased or diminished. The upper end of the cylindrical member 14 is closed by a screw cap 15 and fastened against movement by a seal 19.

Should it become necessary to remove the valve mechanism for the purpose of cleaning or repairing the same, this can be easily accomplished by first unthreading the pipe 11 and removing the screws 32. The assembled valve mechanism is so constructed that it can be removed from the housing as an intact unit and can be mounted in the housing in its operative position by inserting the same through the open end of the body 10. The insertion of the valve mechanism is easily accomplished by manual manipulation of the mechanism whereby the connected ends of the members 42 and 44 are guided into the converging opening 47 of the yoke 18, the connected portions of such members being of such length that the members enter the aperture 47 before the valve mechanism is seated.

In Fig. 4 I have shown a modified form of the device which differs from the construction shown in Figs. 1, 2, and 3 in that for the annular shoulder 34 I have substituted a coupling 55 which functions as a fastening means in place of the screw bolts 32 and I have also provided a member 53 having an annular shoulder 54 seated against the end of a neck 52 projecting from the body 10. The valve mechanism herein shown is similar to that shown in Figs. 1, 2 and 3 and is held against rotation by a lug 57 which projects into a slot 58. The valve mechanism is held fixedly in position by the coupling 55 threaded onto the neck 52. The connection is made fluid tight by a ground joint at 56 or if preferred a gasket may be employed. The pipe 11 is adapted to be threaded into the open end (not shown) of the cylindrical member 53. Further details of construction not shown or described are similar to those already shown and described for the embodiment shown in Fig. 1.

Thus it will be seen that I have provided regulator mechanism operable to control the flow of fluid through a pipe or the like and pressure controlled means operable during flow conditions to maintain the valve mechanism in substantially balanced equilibrium relative to its open and closed position in accordance with the pressure in the device and that such valve mechanism is so constructed that when assembled and intact it is capable of easy removal from and mounting in its housing without dismantling or disassembling either the housing or the pressure controlled means.

Having thus described my invention, it is obvious that various immaterial modifications may be made in the same without departing from the spirit of my invention; hence I do not wish to be understood as limiting myself to the exact form, construction, arrangement, and combination of parts herein shown and described, or uses mentioned.

What I claim as new and desire to secure by Letters Patent is:

1. A fluid pressure regulating device of the kind described comprising a housing and valve mechanism mounted in the housing comprising a valve body, a reciprocally movable plunger mounted in the body operable to open and close the valve, a resilient cantilever member rigidly mounted on the valve body, a compression member fastened at one end to the free end of the cantilever member and having its other end operatively connected with the plunger, and means mounted in the plunger and engageable with said compression member for retaining the compression member and plunger in operative position.

2. A fluid pressure regulating device of the kind described comprising a housing, a high pressure fluid inlet pipe discharging into the housing, valve mechanism operable to control the flow of fluid from said pipe in accordance with predetermined pressure in the housing, said mechanism comprising a valve body, a reciprocally movable plunger mounted in the body, said plunger operable to open and close the valve, a resilient cantilever member rigidly mounted on the valve body in substantially parallel spaced apart relation to the axis of the plunger, and means positively connecting the free end of the cantilever member with said plunger, said cantilever member tending to hold the plunger in substantially closed position in its mounting.

3. A fluid pressure regulating device of the kind described comprising a housing, a high pressure fluid inlet pipe discharging into the housing, valve mechanism operable to control the flow of fluid from said pipe in accordance with predetermined pressure in the housing, said mechanism comprising a valve body, a reciprocally movable plunger mounted in the body, said plunger operable to open and close the valve, a resilient cantilever member rigidly secured to the valve body, means positively connecting the free end of the cantilever with said plunger, said cantilever member tending to hold the plunger in substantially closed position, and pressure controlled means operable during flow conditions to maintain said cantilever member, connecting means and plunger in balanced equilibrium when pressure in the housing reaches a predetermined point.

4. A fluid pressure regulating device of the kind described comprising a housing, a high pressure fluid inlet pipe discharging into the housing, assembled valve mechanism operable to control the flow of fluid from said pipe in accordance with predetermined pressure in the housing, said mechanism comprising a valve body, a reciprocally movable plunger mounted in the body, said plunger operable to open and close the valve, a resilient cantilever member rigidly mounted on the valve body, a compression member rigidly connected to the free end of the cantilever and positively connected to said plunger, said cantilever member tending to hold the plunger in substantially closed position, said assembled valve mechanism being insertable in and removable from the housing as a unit upon disconnecting said inlet pipe.

In witness whereof, I hereunto subscribe my name this 6th day of April, A. D. 1929.

WILLIAM C. BUTTNER.